United States Patent
Arnold et al.

(12) 
(10) Patent No.: US 6,195,999 B1
(45) Date of Patent: Mar. 6, 2001

(54) ELECTROCHEMICAL ENGINE

(75) Inventors: Gerd Arnold, Nauheim (DE); Jonas Bereisa, Bloomfield Hills, MI (US); Michael A. Stratton, Rochester, NY (US); James V. McManis, Batavia, NY (US); William S. Wheat, Rochester, NY (US); Lee Curtis Whitehead, Middleport, NY (US); Daniel B. O'Connell, Rochester, NY (US); Steve McIlwaine, Penfield, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/478,672

(22) Filed: Jan. 6, 2000

(51) Int. Cl.[7] .................................................... F01K 25/06
(52) U.S. Cl. .............................. 60/649; 60/651; 60/671
(58) Field of Search .......................... 60/648, 649, 651, 60/671

(56) References Cited

U.S. PATENT DOCUMENTS

| | | | |
|---|---|---|---|
| 4,503,682 | * | 3/1985 | Rosenblatt ......................... 60/651 X |
| 4,537,031 | * | 8/1985 | Terry et al. ............................ 60/649 |
| 4,739,180 | * | 4/1988 | Yanoma et al. .................... 60/651 X |
| 4,788,824 | * | 12/1988 | Spurr et al. ........................ 60/651 X |

FOREIGN PATENT DOCUMENTS

WO 93/22044  11/1993  (WO).
WO 97/10969   3/1997  (WO).

* cited by examiner

*Primary Examiner*—Hoang Nguyen
(74) *Attorney, Agent, or Firm*—Laura C. Hargitt

(57) ABSTRACT

An electrochemical engine for a vehicle comprises a storage tank containing hydrogen-retention material which reversibly takes-up and stores hydrogen at a hydrogen-storage temperature and releases it upon heating to a release temperature. A fuel cell stack using the released hydrogen produces electricity and heat by-product. A primary coolant flow circuit extends from a radiator, through the fuel cell stack and the storage tank, and back to the radiator, and has a coolant-distribution valve intermediate the fuel cell stack and the storage tank. A bypass coolant flow line extends from the coolant-distribution valve to the radiator. During operation, the heat by-product of the fuel cell stack is transferred via the primary coolant flow circuit to the storage tank for heating the hydrogen-retention material to release hydrogen for fueling the fuel cell stack. The electrochemical engine further comprises a heat generator within a superheater coolant flow loop having a bypass valve intermediate the storage tank and the radiator operable to keep coolant within the superheater coolant flow loop and a secondary pump to circulate the coolant. Coolant in the superheater coolant flow loop is heated by the heat generator and circulated through the storage tank to further release hydrogen gas from the hydrogen-retention material.

13 Claims, 4 Drawing Sheets

ELECTROCHEMICAL ENGINE

TECHNICAL FIELD

The present invention relates to an electrochemical engine particularly useful for a vehicle.

BACKGROUND OF THE INVENTION

As fuel cell power plants are being integrated into useable vehicles, developing efficient ways of supplying the fuel needed to operate the fuel cell stack becomes more critical. Hydrogen gas is the common fuel input to the stack and may be stored on-board in suitable tanks. While pure hydrogen gas is an efficient fuel, storing it on-board a vehicle has drawbacks related to packaging and mass.

As an alternative to storing pure hydrogen gas on-board a vehicle, other fuels such as gasoline or methanol may be stored on-board and processed through a reformer to convert the fuel to reformate comprising hydrogen, carbon dioxide, carbon monoxide, and water vapor. The reformate may be passed through a shift converter and gas purifiers to remove carbon monoxide before delivering the hydrogen to the fuel cell stack. This complete reformation process is not only complex to engineer, but consumes valuable packaging space and mass.

A further consideration in designing a vehicle powered by an electrochemical engine is how to manage the heat produced by the electrochemical reaction in the fuel cell stack. The stack may produce waste heat ranging in temperatures from 80° C. to 100° C. If a traditional thermal management system including a radiator is employed, the radiator will require significant surface area to meet the demands of the electrochemical engine and will be impractical for a commercial vehicle.

SUMMARY OF THE INVENTION

The present invention provides a commercially practical electrochemical engine (ECE) for use in a vehicle.

The electrochemical engine comprises a storage tank containing hydrogen-retention material which reversibly takes-up and stores hydrogen at a hydrogen-storage temperature and releases it as a gas upon heating to a release temperature. A fuel cell stack uses the released hydrogen gas to produce electricity and heat by-product. Heat by-product is transferred from the fuel cell stack to the storage tank via a primary coolant flow circuit that heats the hydrogen-retention material to release hydrogen for fueling the fuel cell stack. A bypass coolant flow line is also provided from the fuel cell stack to the radiator, bypassing the storage tank.

The electrochemical engine may also include a heat generator within a superheater coolant flow loop having a bypass valve intermediate the storage tank and the radiator and operable to isolate coolant within the superheater coolant flow loop and a pump to circulate coolant therethrough. Coolant in the superheater coolant flow loop is heated by the heat generator and circulated through the storage tank to further release hydrogen gas from the hydrogen-retention material.

In order to regenerate the hydrogen-retention material with hydrogen, the storage tank may need to be cooled. Therefore, the ECE provides the capability to circulate pre-refueling coolant from an external source, through the storage tank, thereby cooling the hydrogen-retention material to a temperature where it may take-up and store hydrogen.

Accordingly, the ECE of the present invention provides a more simple solution to managing the input fuel to the fuel cell stack in a less massive and space-intensive package than on-board reforming or storage of pure hydrogen. Further, once the fuel cell stack rises to its normal operating temperature, the process becomes self-sustaining as fuel cell by-product heat is used to release the hydrogen from its stored state. Since a portion of by-product heat is recycled in the engine operation, the thermal management system does not have to manage as much thermal energy.

DESCRIPTION OF THE PREFERRED EMBODIMENT

Figure 1:
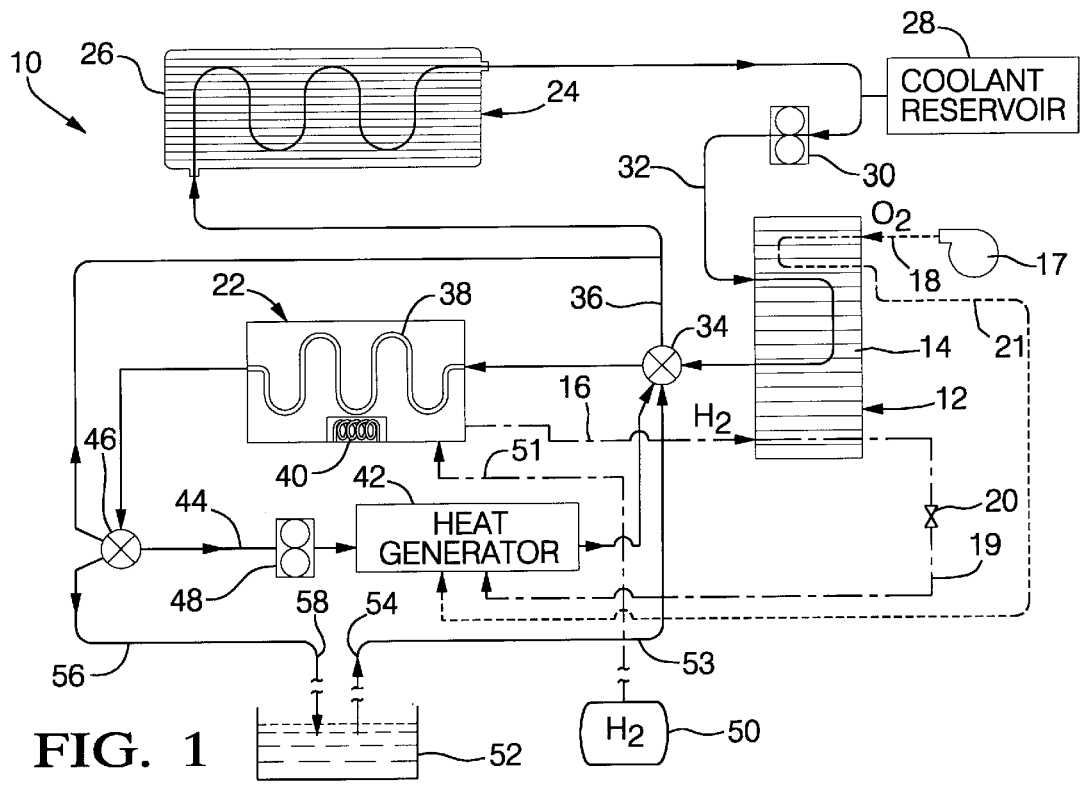
FIG. 1 is a schematic illustration of an electrochemical engine of the present invention.

An electrochemical engine (ECE), shown generally as 10 in FIG. 1, generates electricity to power vehicle accessories or a drive system for propelling a vehicle. Electricity is generated by a known electrochemical reaction between hydrogen and oxygen within a fuel cell stack 12. The fuel cell stack 12 comprises a series of individual fuel cells 14, as is known in the art. Hydrogen gas is fed through a hydrogen delivery line 16, to the anode side of the fuel cells 14. An air generator 17, which may include a compressor and a humidifier, supplies humidified oxidant through an oxidant line 18 to the cathode side of the fuel cells 14. The cathode is separated from the anode by an electrolyte. Electricity and heat are generated in the fuel cell stack 12. An exhaust valve 20 from the anode side to a hydrogen exhaust line 19 is generally closed such that all the hydrogen is consumed in the fuel cell stack 12, but is operable to open and release unconsumed hydrogen. By-products of the cathode, including nitrogen and unconsumed oxygen are exhausted through a cathode exhaust line 21.

Hydrogen, for fueling the electrochemical process in the fuel cell stack 12, is stored in a storage tank 22 in the ECE 10. The storage tank 22 contains "hydrogen-retention material", not shown. By this, it is meant a material which is capable of reversibly taking-up and storing hydrogen at a hydrogen-storage temperature, and releasing it at a release temperature, which is greater than the hydrogen-storage temperature. In one embodiment, the hydrogen-retention material comprises a metal, such as sodium-aluminum, lanthanum-nickelide, titanium, or nickel, which reacts with and stores the hydrogen as a hydride of the metal. A particularly preferred such metal comprises sodium-aluminum, which has a release temperature for most of its retained hydrogen at or near the operating temperature of the fuel cell stack 12. This allows by-product heat from the fuel cell stack 12 to be used to release the hydrogen from the hydride.

In another embodiment, the "hydrogen-retention material" comprises a hydrogen adsorbant which reversibly adsorbs hydrogen at a hydrogen-storage temperature and desorbs it at a release temperature greater than the hydrogen-storage temperature. A preferred such adsorbant comprises carbon nanofibers, although any high volume storage adsorbant may suffice. With either type of hydrogen-retention material, heating the storage tank 22 releases hydrogen gas which is supplied through the hydrogen delivery line 16 to the electrochemical reaction in the fuel cell stack 12 as discussed above.

The ECE 10 further includes a thermal management system 24 including a radiator 26, a coolant reservoir 28, a primary coolant pump 30 and a primary coolant flow circuit 32 to circulate coolant throughout the engine. The primary coolant flow circuit 32 extends from the coolant reservoir 28, through the primary coolant pump 30, the fuel cell stack 12, the storage tank 22, the radiator 26, and back to the coolant reservoir 28. A coolant-distribution valve 34 is interposed between the fuel cell stack 12 and the storage tank 22 along the primary coolant path 32. A bypass coolant flow line 36 extends from the distribution valve 34 to the radiator 26.

The primary coolant flow circuit 32 delivers low temperature coolant to the fuel cell stack 12 to transfer the heat by-product out of the stack and deliver it to the storage tank 22. The storage tank 22 contains conduits 38 (e.g. coils) through which the heated coolant is circulated to heat the hydrogen-retention material. Heated coolant may also bypass the storage tank 22 and be delivered directly to the radiator 26 via the bypass coolant flow line 36 from the coolant-distribution valve 34. The coolant-distribution valve 34 is operable to direct heated coolant from the fuel cell stack 12 to either or both the storage tank 22 or the radiator 26.

To initiate ECE start-up, an electric heating element 40 may be provided in, or adjacent to, the storage tank 22 for providing initial electrically-generated heat to the hydrogen-retention material for releasing hydrogen gas to fuel the fuel cell stack 12. The heating element 40 need only operate for a short period of time until the ECE 10 becomes self-sustaining, meaning the fuel cell stack 12 is producing enough heat to release hydrogen from the storage tank 22 to fuel the stack. Therefore, the parasitic energy expended by the heating element 40 is minimized.

With any of the hydrogen-retention materials employed, a majority of the hydrogen may be released at the release temperature, but to completely release substantially all of the hydrogen, the temperature may need to be elevated to a higher, superheated release temperature. As an example, with doped sodium-aluminum-hydride, approximately 70% of the hydrogen stored may be released by the by-product heat routed from the fuel cell stack 12, which operates at approximately 80° C. To release the balance of the hydrogen, the hydride must be "superheated" to a superheated release temperature of approximately 150° C.

Superheating the hydrogen-retention material may be accomplished by including a heat generator 42 within a superheater coolant loop 44, and isolating coolant within this loop so that the heat generator may heat it. To isolate the superheater coolant loop 44 from the balance of the coolant flow, a bypass valve 46 is included intermediate the storage tank 22 and the radiator 26. Further, a secondary pump 48 is included in the superheater coolant loop 44 to circulate the superheated coolant. Therefore, the superheater coolant loop 44 includes the coolant-distribution valve 34, the storage tank 22, the bypass valve 46, the secondary pump 48, and the heat generator 42.

The heat generator 42 may operate as a catalytic reactor where unconsumed hydrogen is exhausted by the anode of the fuel cell stack 12 and is routed through hydrogen exhaust line 19 to the heat generator for catalytic combustion therein. Additionally, nitrogen and unconsumed oxygen exhausted by the cathode are routed to the heat generator 42 in the cathode exhaust line 21. The combustion reaction in the heat generator 42 generates thermal energy which may be transferred to the storage tank 22 via the superheater coolant loop 44. Including the heat generator 42 in the ECE 10 allows substantially all of the hydrogen stored in the hydrogen-retention material to be utilized. The heat generator 42 is an efficient alternative to generating heat electrically.

To replenish the supply of hydrogen stored in the storage tank 22, hydrogen gas is supplied from an external source, such as a refueling station 50, through a hydrogen refueling line 51, to the storage tank. In order to regenerate the hydrogen-retention material with hydrogen, the material may need to be cooled to the hydrogen-storage temperature, which may be about 20° C. The ECE 10 of the present invention provides the capability for circulating pre-refueling coolant from an off-board cooling station 52, through the storage tank 22 prior to refilling the tank with hydrogen gas. An inlet coolant line 53 connects a filler inlet 54 to the coolant-distribution valve 34, which directs pre-refueling coolant through the storage tank 22. Heat transferred to the pre-refueling coolant from the hydrogen-retention material flows out an outlet coolant line 56 from the bypass valve 46 to a filler outlet 58 adjacent the filler inlet 54. Therefore, prior to refilling the storage tank 22 with gas, the storage tank may be cooled by circulating pre-refueling coolant from the filler inlet 54, through the coolant-distribution valve 34, the storage tank 22, the bypass valve 46, and out the outlet coolant line 56 and filler outlet 58. This circulation of pre-refueling coolant accelerates the cooling process and allows the operator to quickly refuel without having to wait for extended periods of time for the storage tank 22 to cool to the hydrogen-storage temperature.

Figure 2:
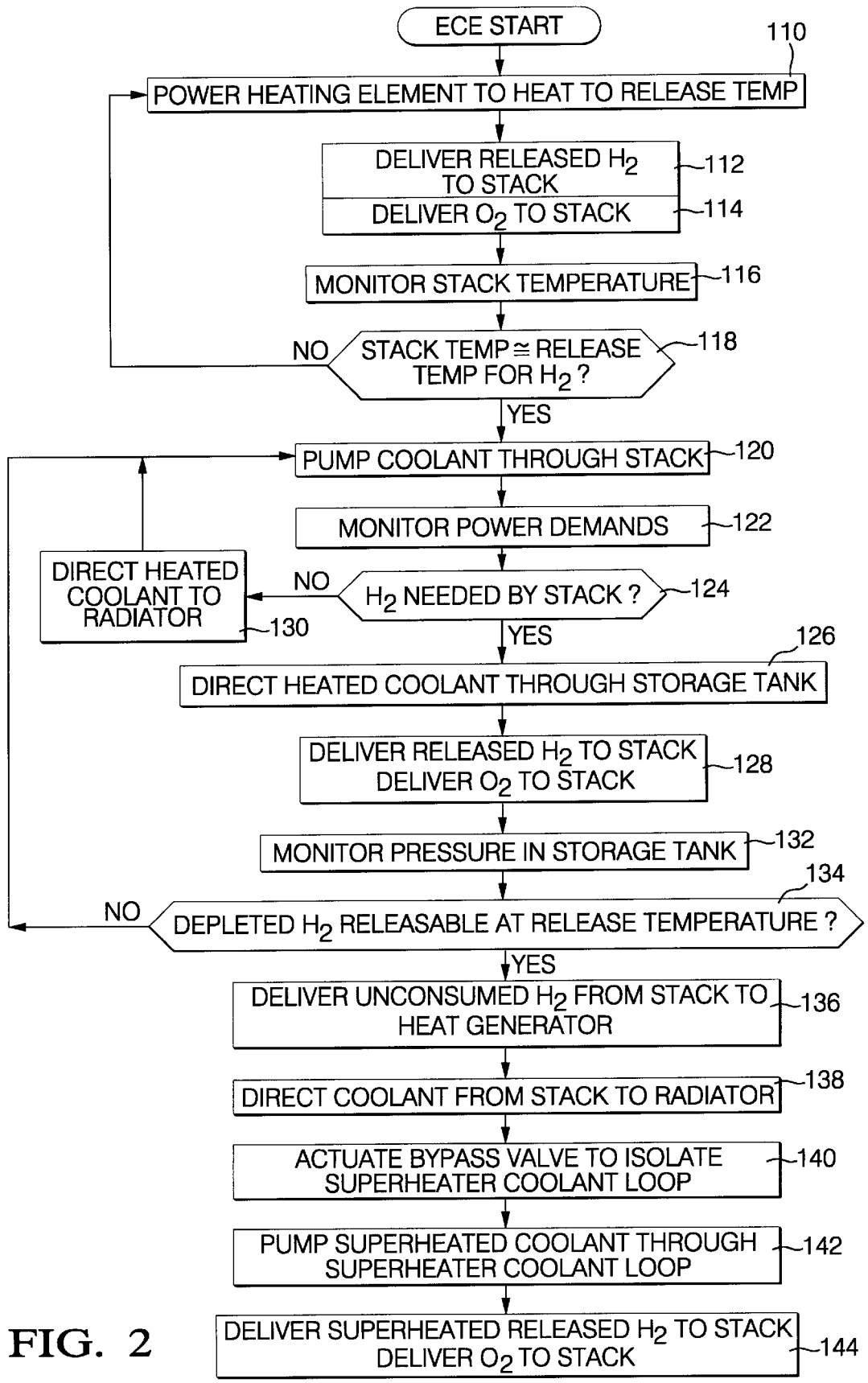
FIG. 2 is a flow chart of a method of controlling the operation of the electrochemical engine of FIG. 1.

The steps for controlling the operation of the ECE 10 by a controller, not shown, are illustrated in the flow chart of FIG. 2. In particular, to initiate operation of the ECE 10, the controller signals for the heating element 40 to be powered in block 110, which is used initially to heat the hydrogen-retention material in the storage tank 22 to the release temperature. Released hydrogen gas is delivered to the anode of the fuel cell stack 12 in block 112. Concurrently, the controller signals the air generator 17 to deliver humidified oxidant to the cathode of the fuel cell stack 12 in block 114. The controller monitors the fuel cell stack temperature in block 116 and as it approaches its operating temperature, which approximates the hydrogen release temperature in block 118, the controller signals operation of the primary coolant pump 30 to circulate coolant through the fuel cell stack 12 in block 120.

The controller monitors the demands on the fuel cell stack 12 for power (e.g. vehicle acceleration) to determine how much hydrogen gas is needed in the fuel cell stack in block 122. If the stack 12 demands more hydrogen gas in block 124 and the operating temperature of the fuel cell stack 12 is at the release temperature, the controller signals the coolant-distribution valve 34 to direct heated coolant from the stack through the storage tank 22 in block 126. This heats the hydrogen-retention material to the release temperature to release more hydrogen gas to the fuel cell stack 12 in block 128. If more gas is not needed by the fuel cell stack 12, the controller signals the coolant-distribution valve 34 to divert the heated coolant from the stack 12, through the bypass coolant flow line 36 to the radiator 26 in block 130.

The controller monitors the pressure in the storage tank 22 in block 132. As the pressure drops because the hydrogen releasable at the release temperature is depleted in block 134, then the temperature in the storage tank must be elevated to the superheated release temperature, which is greater than the coolant temperature from the fuel cell stack 12. The controller signals the exhaust valve 20 to exhaust unconsumed hydrogen from the fuel cell stack 12 to the heat generator 42 for heat generation in block 136. Additionally, the controller signals the coolant-distribution valve 34 to direct coolant flow to the radiator 26 and not to allow flow into the superheater coolant loop 44 in block 138. The controller actuates the bypass valve 46 so that the superheater coolant loop 44 is a closed loop in block 140, therefore no coolant is allowed to flow from the storage tank 22 to the radiator 26. The secondary pump 48 is powered to circulate superheated coolant through the superheater coolant loop 44 in block 142. The heat generator 42 heats the isolated coolant until it reaches the superheated release temperature for releasing the balance of hydrogen stored in the storage tank 22 to the fuel cell stack 12 in block 144.

When the vehicle is to be refilled with hydrogen gas, the controller monitors the storage tank temperature to check if it is above the hydrogen-storage temperature needed for the hydrogen-retention material to capture hydrogen gas. If it is above the hydrogen-storage temperature, then pre-refueling coolant may be added in the filler inlet 54, and circulated through the inlet coolant line 53, diverted by the coolant-distribution valve 34, through the storage tank 22, diverted by the bypass valve 46, and out the outlet coolant line 56. Once the storage tank temperature is cooled to the hydrogen-storage temperature, then hydrogen gas may be added to the storage tank 22 to be taken-up and stored by the hydrogen-retention material.

Figure 3:
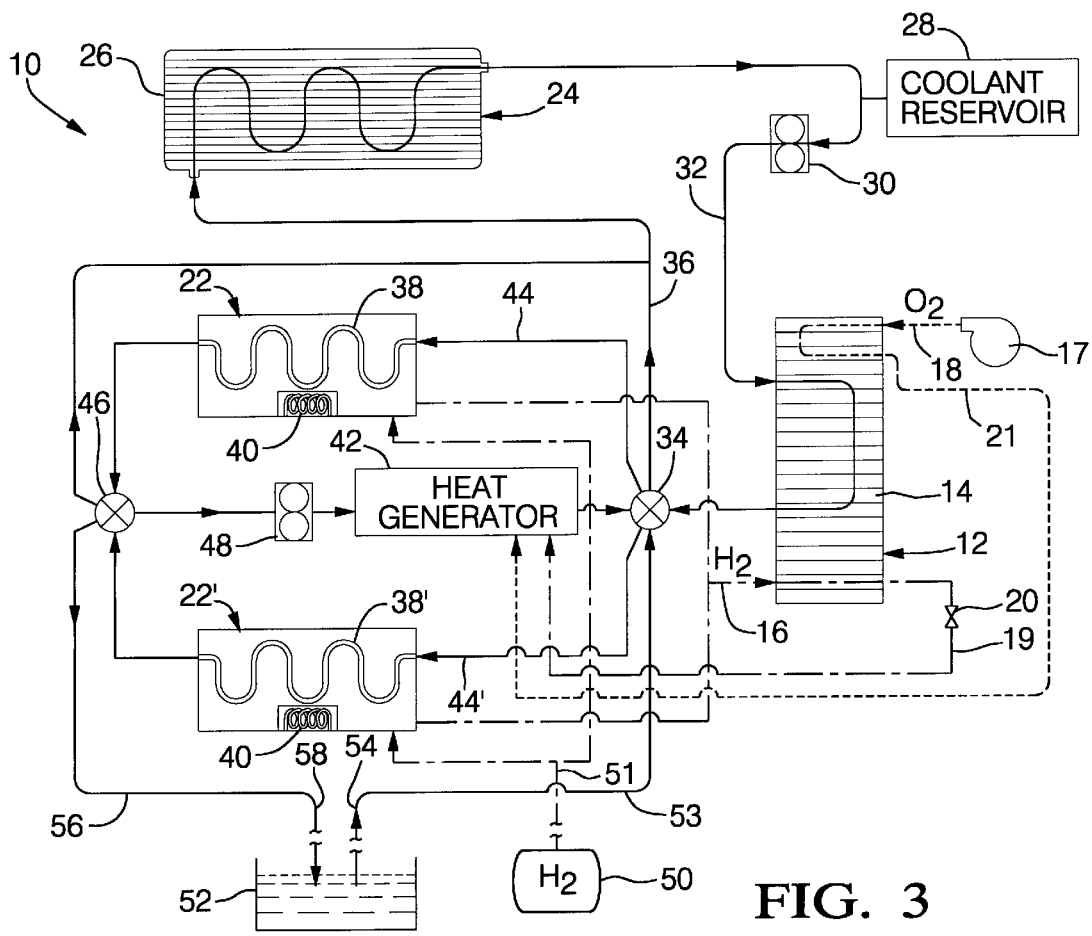
FIG. 3 is a schematic illustration of a second embodiment for an electrochemical engine.

To further provide packaging benefits and cooling efficiencies, the ECE 10 could include two or more storage tanks, referred to as first storage tank 22 and second storage tank 22', as needed to fit the packaging space and volume requirements. Such an ECE 10 is illustrated in FIG. 3 with like components designated by the same reference numbers as in FIG. 1.

Figure 4A:
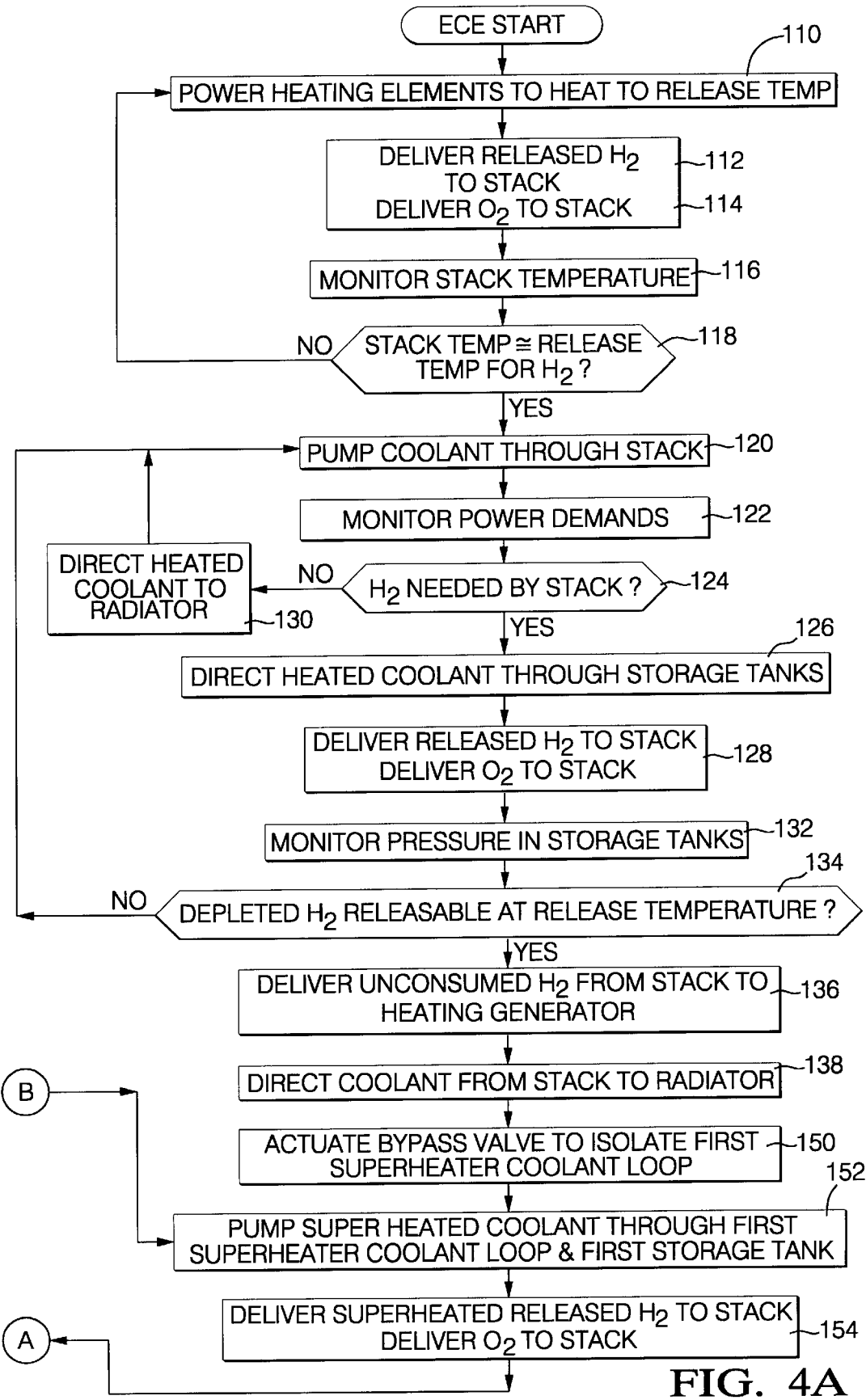
FIGS. 4A and 4B embody one flow chart of a method of controlling the operation of the electrochemical engine of FIG. 3.
Figure 4B:
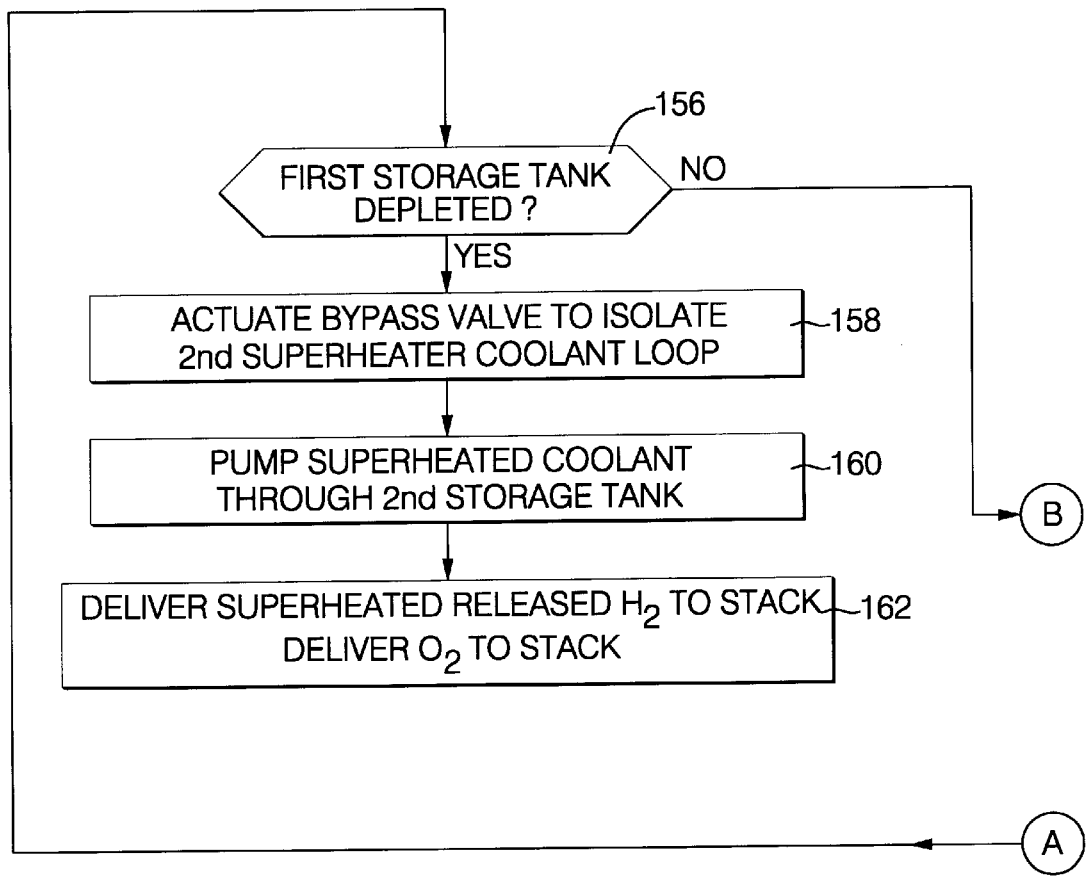

The steps for controlling the operation of the ECE 10 having two storage tanks 22 and 22' are illustrated in the flow chart of FIGS. 4A and 4B. Steps 110–138 are equivalent to those described above. The steps for superheating the storage tanks differ from above in that further efficiencies are attained by superheating only one of the storage tanks at a time to release the balance of the hydrogen stored therein. Once the controller determines that the hydrogen releasable at the release temperature is depleted in block 134, it begins the superheating process for one of the storage tanks, here described for the first storage tank 22. The controller signals the exhaust valve 20 to exhaust unconsumed hydrogen from the stack 12 to the heat generator 42 for heat generation in block 136. Additionally the controller signals the coolant-distribution valve 34 to direct coolant flow to the radiator 26 in block 138 and not to allow flow into the first and second superheater coolant loops 44 and 44'. The controller actuates the bypass valve 46 so that only the first superheater coolant loop 44 is a closed loop in block 150, therefore no coolant is allowed to flow from the first storage tank 22 to the radiator 26. The secondary pump 48 is powered to circulate superheated coolant through the first superheater coolant loop 44 in block 152. The heat generator 42 continues to heat the isolated coolant until it reaches the superheated release temperature for releasing the balance of hydrogen stored in the first storage tank 22 to the fuel cell stack 12 in block 154.

Once the first storage tank 22 is depleted in block 156, the second storage tank 22' is superheated to release the balance of the hydrogen stored therein. The bypass valve 46 is actuated to isolate the second superheater coolant loop 44' in block 158. Heat generated by the heat generator 42 is pumped through the second storage tank 22' in block 160, releasing stored hydrogen to the fuel cell stack 12 in block 162.

Concurrently while the second storage tank 22' is superheated, the first storage tank 22 is cooling from the superheated release temperature. Therefore, when the vehicle is brought to the refueling station 50, the first storage tank 22 may already be cooled to the hydrogen-storage temperature for refueling.

The ECE 10 of the present invention provides an efficient system for managing the input fuel to the fuel cell stack 12 and waste heat from the stack. Hydrogen gas is stored on-board the vehicle in a 'captured' state by the hydrogen-retention material. Preferably a material is selected that is operable to release hydrogen at approximately the operating temperature of the fuel cell stack 12. Therefore by-product heat generated in the fuel cell stack 12 may be utilized to release more hydrogen gas as needed.

Since the ECE 10 takes advantage of the by-product heat generated in the fuel cell stack 12 for releasing stored hydrogen, the thermal management system 24 has less thermal energy to manage. On the order of 25% of the by-product heat is recycled into the engine operation, making the overall operation more energy efficient. Additionally, the radiator 26 required to manage by-product heat produced by the fuel cell stack 12 may be a commercially-reasonable package size, facilitating the integration of an ECE 10 into a vehicle.

The ECE 10 of the present invention also has pre-refueling cooling capability for circulating coolant through the storage tank 22. This allows the storage tank 22 to be refilled with hydrogen to its capacity without unreasonable delay to the consumer.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An electrochemical engine, comprising:
a storage tank containing hydrogen-retention material which upon heating to a release temperature releases stored hydrogen, a fuel cell stack using the released hydrogen to produce electricity and heat by-product, a radiator, a primary coolant flow circuit through said radiator, said fuel cell stack and said storage tank, whereby the heat by-product of said fuel cell stack is transferred via said primary coolant flow circuit to said storage tank for heating said hydrogen-retention material to the release temperature to release hydrogen for fueling said fuel cell stack.

2. An electrochemical engine, as defined by claim 1, wherein said hydrogen-retention material is a metal hydride which reversibly takes-up and stores hydrogen at a hydrogen-storage temperature, and releases it at the release temperature, which is about the operating temperature of said fuel cell stack.

3. An electrochemical engine, as defined by claim 1, wherein said hydrogen-retention material is a hydrogen adsorbant which reversibly adsorbs hydrogen at a hydrogen-storage temperature and desorbs hydrogen at the release temperature, which is about the operating temperature of said fuel cell stack.

4. An electrochemical engine, as defined by claim 1, further comprising a heating element operatively associated with said storage tank for initially heating said hydrogen-retention material to release hydrogen to fuel said fuel cell stack upon electrochemical engine start-up.

5. An electrochemical engine, as defined by claim 1, further comprising a superheater coolant flow loop including said storage tank and a heat generator operable to heat coolant in said superheater coolant flow loop to further release hydrogen from said hydrogen-retention material in said storage tank.

6. An electrochemical engine, as defined by claim 5, wherein said heat generator is operable to heat coolant in said superheater coolant flow loop to a superheated release temperature at which said hydrogen-retention material operates to release the balance of hydrogen stored therein.

7. An electrochemical engine, as defined by claim 5, further including a hydrogen exhaust line extending between said fuel cell stack and said heat generator to carry unconsumed hydrogen from said fuel cell stack to said heat generator to generate heat for heating coolant in said superheater coolant flow loop.

8. An electrochemical engine, as defined by claim 5, wherein said superheater coolant flow loop further includes a bypass valve intermediate said storage tank and said radiator operable to keep coolant within said superheater coolant flow loop for heating by said heat generator.

9. An electrochemical engine, as defined by claim 8, further comprising an inlet coolant line from a filler inlet to said storage tank and an outlet coolant line from said bypass valve to a filler outlet adjacent said filler inlet, wherein prior to refilling said storage tank with hydrogen, said storage tank is cooled by circulating pre-refueling coolant from said filler inlet, through said inlet coolant line, said storage tank, said bypass valve, and out said outlet coolant line and said filler outlet.

10. An electrochemical engine, as defined by claim 9, wherein said storage tank is cooled to a hydrogen-storage temperature at which said hydrogen-retention material operates to capture hydrogen gas.

11. An electrochemical engine for a vehicle, comprising:
a storage tank containing hydrogen-retention material which reversibly takes-up and stores hydrogen at a hydrogen-storage temperature and releases it upon heating to a release temperature, a fuel cell stack using the released hydrogen to produce electricity and heat by-product, a radiator, a primary coolant flow circuit through said radiator, fuel cell stack and storage tank, a coolant-distribution valve in said primary coolant flow circuit intermediate said fuel cell stack and said storage tank, and a bypass coolant flow line from said coolant-distribution valve to said radiator, wherein said coolant-distribution valve is operable to direct heated coolant from said fuel cell stack to either or both said storage tank or said radiator, whereby the heat by-product of said fuel cell stack is transferred via said primary coolant flow circuit to said storage tank for heating said hydrogen-retention material to the release temperature to release hydrogen gas for fueling said fuel cell stack, and said electrochemical engine further comprising a heat generator within a superheater coolant flow loop having a bypass valve intermediate said storage tank and said radiator operable to keep coolant within said superheater coolant flow loop and a pump to circulate the coolant, wherein said superheater coolant flow loop extends from said coolant-distribution valve, through said storage tank, said bypass valve, said pump, said heat generator, and back to said coolant-distribution valve, and wherein said heat generator operates to heat the coolant in said superheater coolant flow loop and said pump circulates the heated coolant through said storage tank to further release hydrogen from said hydrogen-retention material.

12. A method for controlling the operation of the electrochemical engine, defined in claim 11, comprising the steps of:
pumping coolant through said fuel cell stack to heat the coolant; directing the coolant heated by said fuel cell stack through said storage tank to heat said hydrogen-retention material to the release temperature;
monitoring the pressure in said storage tank to determine if hydrogen releasable at the release temperature is depleted;
if hydrogen releasable at the release temperature is depleted, delivering by-product hydrogen from said fuel cell stack to said heat generator;
heating coolant in said superheater coolant loop by said heat generator; and
pumping the heated coolant through said storage tank to heat said hydrogen-retention material to a superheated release temperature to release the balance of stored hydrogen.

13. A method for controlling the operation of an electrochemical engine having a fuel cell stack and first and second storage tanks containing hydrogen-retention material, comprising the steps of:
pumping coolant through said fuel cell stack to generate heated coolant;
monitoring the demand for power from said fuel cell stack and hence the demand for hydrogen in said fuel cell stack;
if hydrogen gas is demanded by said fuel cell stack, directing the heated coolant through said first and second storage tanks to heat said hydrogen-retention material to a hydrogen release temperature;
monitoring the pressure in said storage tanks to see if hydrogen releasable at the release temperature is depleted;
if hydrogen releasable at the release temperature is depleted, delivering by-product hydrogen from said fuel cell stack to said heat generator;
actuating a bypass valve to isolate a first superheater coolant loop comprising said heat generator, said first storage tank, and a pump;
heating coolant in said first superheater coolant loop by said heat generator;
pumping the superheated coolant through said first storage tank to heat said hydrogen-retention material to a superheated release temperature to release the balance of stored hydrogen in said first storage tank;
upon depletion of hydrogen stored in said first storage tank, actuating said bypass valve to isolate a second superheater coolant loop comprising said heat generator, said second storage tank, and said pump;

heating coolant in said second superheater coolant loop by said heat generator;

pumping the superheated coolant through said second storage tank to heat said hydrogen-retention material to the superheated release temperature to release the balance of stored hydrogen in said second storage tank.

\* \* \* \* \*